(12) United States Patent
Karhu et al.

(10) Patent No.: US 11,194,381 B2
(45) Date of Patent: Dec. 7, 2021

(54) TECHNIQUES FOR CONTROLLING PROCESSOR PERFORMANCE STATES

(71) Applicant: INTEL CORPORATION, Santa Clara, CA (US)

(72) Inventors: Abhinav Karhu, Hillsboro, OR (US); Russell Fenger, Beaverton, OR (US); Vijay Dhanraj, Beaverton, OR (US); Balaji Masanamuthu Chinnathurai, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/642,203

(22) PCT Filed: Sep. 29, 2017

(86) PCT No.: PCT/US2017/054236
§ 371 (c)(1),
(2) Date: Feb. 26, 2020

(87) PCT Pub. No.: WO2019/066886
PCT Pub. Date: Apr. 4, 2019

(65) Prior Publication Data
US 2020/0356156 A1    Nov. 12, 2020

(51) Int. Cl.
*G06F 1/3234* (2019.01)
*G06F 1/3228* (2019.01)
*G06F 11/30* (2006.01)

(52) U.S. Cl.
CPC .......... *G06F 1/3243* (2013.01); *G06F 1/3228* (2013.01); *G06F 11/3024* (2013.01); *G06F 11/3062* (2013.01)

(58) Field of Classification Search
CPC .. G06F 1/3243; G06F 1/3228; G06F 11/3024; G06F 11/3062
See application file for complete search history.

(56) References Cited

U.S. PATENT DOCUMENTS

2001/0003206 A1    6/2001  Pole, II et al.
2003/0109967 A1*   6/2003  Cooper ................. G06F 1/3203
                                                        700/299

(Continued)

OTHER PUBLICATIONS

International Preliminary Report on Patentability, Application No. PCT/US2017/054236, dated Apr. 9, 2020, 8 pages.

(Continued)

*Primary Examiner* — Nimesh G Patel
(74) *Attorney, Agent, or Firm* — Kacvinsky Daisak Bluni PLLC

(57) ABSTRACT

Techniques and apparatus for managing performance states of processing circuitry of a computing device are described. In one embodiment, for example, an apparatus may include at least one memory, at least one processing circuitry, and logic, at least a portion of comprised in hardware coupled to the at least one processing circuitry, to set a first performance state (P-state) of the at least one processing circuitry based on system utilization information, access a performance interface element comprising a plurality of performance metric hints, update the first P-state to a second P-state responsive to one of the plurality of performance metric hints being set by an operating system (OS) of the apparatus, and maintain the first P-state responsive to none of the plurality of performance metric hints being set by the operating system (OS). Other embodiments are described and claimed.

25 Claims, 11 Drawing Sheets

(56) References Cited

U.S. PATENT DOCUMENTS

| | | | |
|---|---|---|---|
| 2005/0192788 A1 | 9/2005 | Hobson | |
| 2005/0262365 A1* | 11/2005 | Lint | G06F 11/3452 |
| | | | 713/300 |
| 2009/0150693 A1* | 6/2009 | Kashyap | G06F 1/3203 |
| | | | 713/320 |
| 2010/0115343 A1 | 5/2010 | Floyd et al. | |
| 2010/0191936 A1 | 7/2010 | Khatri et al. | |
| 2010/0306768 A1* | 12/2010 | Khatri | G06F 11/3065 |
| | | | 718/1 |
| 2016/0077576 A1* | 3/2016 | Karhu | G06F 1/3206 |
| | | | 713/323 |
| 2016/0098338 A1* | 4/2016 | Khatri | G06F 9/45533 |
| | | | 718/1 |

OTHER PUBLICATIONS

International Search Report and Written Opinion for the International Patent Application No. PCT/US2017/054236, dated Jun. 28, 2018, 10 pages.

\* cited by examiner

| HOBL KPIs | HWP Balanced (Default) | Hybrid Performance State Management Process | HWP High-Performance |
|---|---|---|---|
| Productivity | 1380.87 | 1325.7 | 1940.6 |
| Web Browsing | 1963.84 | 1807.78 | 2319.99 |

Package power consumption (from EMON counters) mW (average of 3+ runs)

TECHNIQUES FOR CONTROLLING PROCESSOR PERFORMANCE STATES

CROSS-REFERENCE TO RELATED APPLICATION

This application is a national stage application claiming the benefit of and priority to International Application No. PCT/US17/54236 entitled "TECHNIQUES FOR CONTROLLING PROCESSOR PERFORMANCE STATES" filed Sep. 29, 2017, which is hereby incorporated by reference in its entirety.

TECHNICAL FIELD

Embodiments herein generally relate to computer processors, and more particularly, to hardware, software, and hardware and software based techniques for managing power states of computer processors.

BACKGROUND

Advances in processor technology have escalated the power demands of computing systems. In addition, energy efficiency has become an important concern for computing system operators, particularly for large installations, such as a data center or a corporate network system. However, increasing the operational frequency of a processing device to achieve improved system responsiveness leads to higher power consumption and, therefore, decreased energy efficiency.

BRIEF DESCRIPTION OF THE DRAWINGS

FIGS. 7A-7C. depict experimental results of a processes configured according to some embodiments.

DETAILED DESCRIPTION

Figure 1:
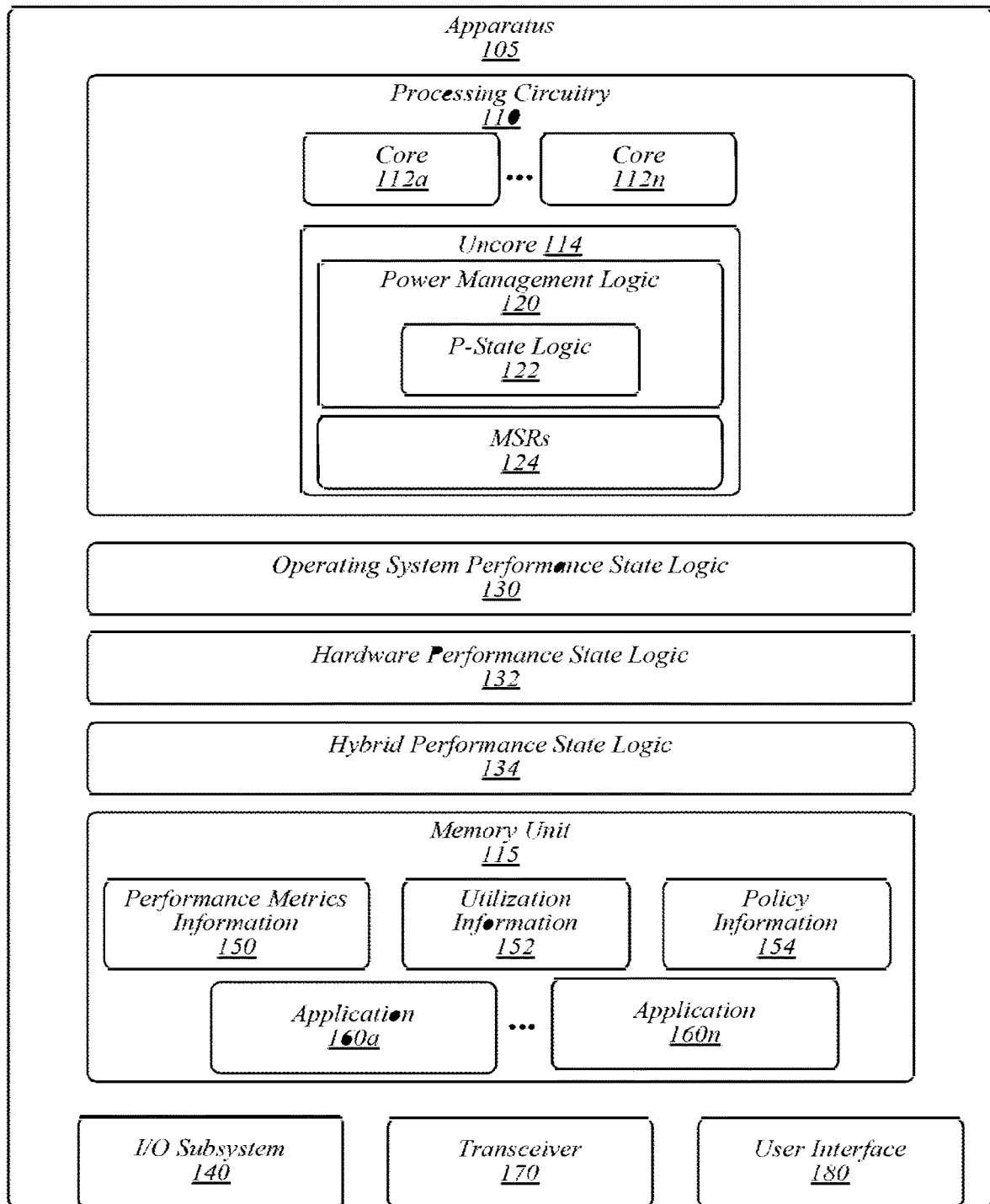
FIG. 1 illustrates an embodiment of a first operating environment.

Various embodiments may be generally directed to techniques for managing performance of a computing system. For example, some embodiments may include a computing device having power management logic operative to manage the power management states (P-states) of a processing circuitry of the computing device. In general, a P-state involves the operating power state of a processor or portion thereof (for instance, a processor core), which may relate to the operational frequency, power, and/or voltage. The P-states are voltage-frequency pairs that set the speed and power consumption of a processor or portion or coprocessor thereof. When the operating voltage of the processor is lower, so is the power consumption. In addition, because the frequency is lowered in tandem with the voltage, the lower frequency results in slower computation. The lower the P-state, the greater the operating frequency. For example, an Intel®-based processor may have a P-state of P0 in which the processor operates at about 2.3 gigahertz (GHz) and a P-state of P1 in which the processor operates at about 980 megahertz (MHz).

In some embodiments, the power management logic may determine the P-state of the processing circuitry based on a hardware-based power management process, a software-based (or operating system (OS)-based) processes, and/or a hybrid power management process based on both hardware-based processes and software-based processes. In exemplary embodiments, the power management logic may determine the P-state of the processing circuitry based on performance metrics information. Non-limiting examples of performance metrics information may include system utilization information, such as processor utilization information, input/output (I/O) information, memory operation information, user interaction information, producer-consumer information and/or the like.

Developers and systems operators demand increasing processor responsiveness and performance Increasing processor operating frequency to achieve responsiveness, for example, by turning off or limiting power management decreases energy efficiency. Accordingly, some embodiments operate to improve responsiveness while maintaining energy efficiently through, among other things, effectively managing system P-states.

Conventional processes for P-state selection are primarily based on utilization of the system. For instance, OS-based Advanced Configuration and Power Interface (ACPI) P-state methods monitor the utilization of the system over a specified time interval and selects a P-state anticipating the same utilization pattern in the near future. However, OS-based methods generally involve sample rates and monitoring intervals that are too large for efficient P-state selection. For example, OS-based methods result in poor P-state selection effectiveness for bursty workloads that are not picked up by the monitoring intervals.

Hardware-based methods are able to provide improved responsiveness over OS-based methods. For example, hardware P-states (HWP), such as implemented using Intel® Speed Shift Technology provide hardware operative to autonomously select P-state based on processor utilization information (for example, utilization-based P-state selection (UBPS)). Hardware-based methods may be able to make P-state decisions at a much finer granularity as compared with OS-based methods. For example, HWP provides increased responsiveness for workloads whose performance is based on utilization. However, there are several workloads in both client and server space which are not processor-intensive, but require responsiveness and performance that cannot be provided by conventional OS-based or hardware-based processes.

Therefore, conventional approaches to processor power management have proven to lack sufficient responsiveness and/or crucial information to effectively manage a processor power state. For example, typical software-based approaches generally involve sample rates can cause incorrect utilization calculations and that miss transitory conditions and/or bursty workloads. In another example, conventional hardware-based approaches are only capable of monitoring workloads based on a narrow band of utilization information, therefore missing other factors that provide important data for determining processor frequency.

Accordingly, some embodiments include a hybrid performance state logic operative to perform a hybrid performance state process that provides OS-based and hardware-based performance monitoring and management of performance based on performance metrics that are not monitored in conventional processes. For example, in some embodiments, a hybrid performance state logic may monitor for I/O conditions, memory condition, user interaction conditions, and consumer-producer conditions.

An I/O activity may require processor resources, but may not cause enough processor utilization to exceed thresholds for conventional performance management methods to change processor P-state. For example, an intensive I/O activity may cause around 10 to 200 deferred procedure call (DPC), softIRQs, tasklets, and/or the like to be scheduled on a processor (or each processor of a multi-processor system) over a 30 millisecond (ms) interval. Such activities may not be detected by hardware-based performance management methods and only cause about 10%-30% processor utilization. Accordingly, in some embodiments, the hybrid performance state logic may monitor for performance metrics information that includes I/O conditions, including, without limitation, interrupt requests, DPCs, softIRQs, tasklets, and/or the like.

Memory operations may require system resources, including processor resources, that are not detected by conventional performance management methods. For example, during an application launch, the rate of soft page faults increases to about 2-20 faults/ms. However, hardware-based performance monitoring methods are not aware of the page faults and, as such, cannot change the P-state leading to undesirable user experience. Therefore, in various embodiments, the hybrid performance state logic may monitor for performance metrics information that includes memory operations, including, but not limited to, soft page faults.

When a user interacts with a computing system, for example, using an input device, processor utilization is very low and conventional performance management methods, particularly hardware-based performance management may fail to detect the user interaction as such events are not tracked. Thus, conventional performance management methods would fail to change the P-state due to such events, resulting in a diminished user experience. Accordingly, in some embodiments, the hybrid performance state logic may monitor for performance metrics information that includes, but is not limited to, user interaction events (for instance, input device events).

In certain computing systems, such as a per-core P-state system (PCSP), multi-thread dependencies (for instance, producer-consumer workloads) cannot be detected by performance management methods, particularly hardware-based performance management methods. If certain threads are processor-intensive, while others are not, a hardware-based performance management methods would not be able to adjust the P-state, resulting in sub-optimal performance of the workloads as a whole. Therefore, in various embodiments, the hybrid performance state logic may monitor for performance metrics information that includes, without limitation, producer-consumer dependencies (thread dependencies) information.

In some embodiments, the hybrid performance state logic may provide a hybrid performance state selection process using hardware-based logic and software (OS)-based logic to provide responsiveness and comprehensive performance metrics information. In various embodiments, the hybrid performance state logic may use hardware-based P-states and OS-based hints. In some embodiments, system hardware and/or software may track performance metrics to generate performance metrics information. Hybrid performance state logic may determine whether any performance metric has crossed a threshold, for example, within a specified time interval, and cause a change in the P-state accordingly. In exemplary embodiments, software performance state logic may provide hints (for instance, HWP energy performance preference (EPP), minimums, maximums, and/or the like) and hardware performance state logic (for instance, UBPS or UBPS-based) may use these hints during performance of a hardware-based performance management process (for instance, HWP or HWP-based). In some embodiments, hardware performance state logic may determine a target performance state (P-state) taking the software-based hints into account, as well as internal targets (for instance, UBPS). In various embodiments, the hardware performance state logic may provide selected P-state feedback to software, such as the OS.

In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner FIG. 1 illustrates an example of an operating environment 100 that may be representative of various embodiments. The operating environment 100 depicted in FIG. 1 may include an apparatus 105 having a processing circuitry 110, a memory unit 115, and a transceiver 170.

Apparatus 110a-n may include various computing devices. Non-limiting examples of computing devices may include mobile computing devices, smartphones, tablet computing devices, workstations, personal computers (PCs), laptops, software operating on a computing device implementing any of the foregoing (for instance, a virtual machine (VM)), networking equipment, switches, hubs, routers, nodes (for instance, an eNodeB), and/or the like.

Processing circuitry 110 may include and or may access logic having instructions for performing operations according to some embodiments. Processing circuitry 110 may be communicatively coupled to memory unit 115 and/or transceiver 170. In various embodiments, processing circuitry 110 may include a CPU or a GPU. In some embodiments, processing circuitry 110 may be implemented on a system-on-a-chip (SoC). In some embodiments, processing circuitry 110 may be implemented as a standalone processor die. Processing circuitry 110 may include one or more processing cores 112a-n, such as 1, 2, 4, 6, 8, 10, 12, or 16 processing cores. Embodiments are not limited in this context. Processing circuitry 110 may include any type of computational element, such as, but not limited to, a microprocessor, a microcontroller, a complex instruction set computing (CISC) microprocessor, a reduced instruction set (RISC) microprocessor, a very long instruction word (VLIW) microprocessor, a virtual processor (for example, a VCPU), or any other type of processor or processing circuit. In some embodiments, processing circuitry 110 may be one or more processors in the family of Intel® processors available from Intel® Corporation of Santa Clara, Calif., such as an Intel® Xeon® processor and/or Intel HD or Iris® graphics processors. Although only one processing circuitry 110 is depicted in FIG. 1, apparatus 105 may include a plurality of processing units Processing circuitry 110 may include and/or may access various logic for performing processes according to some embodiments. For instance, processing circuitry 110 may include and/or may access power management logic 120, P-state logic 122, hardware performance state logic 132, OS performance state logic 132, and/or hybrid performance state logic 134. Although FIG. 1 depicts power management logic 120, P-state logic 122, hardware performance state logic 132, OS performance state logic 132, and/or hybrid performance state logic 134 as separate logic structures, embodiments are not so limited, as power management logic 120, P-state logic 122, hardware performance state logic 132, OS performance state logic 132, and/or hybrid performance state logic 134 may be configured as one or a plurality of combinations of logic structures.

Power management logic 120, P-state logic 122, hardware performance state logic 132, OS performance state logic 132, and/or hybrid performance state logic 134 may be implemented in hardware, software, or a combination thereof. As used in this application, the terms "logic, "component," "layer," "system," "circuitry," and/or "module" are intended to refer to a computer-related entity, either hardware, a combination of hardware and software, software, or software in execution, examples of which are provided by the exemplary computing architecture 900. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, a controller, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Processing circuit 110 may include an uncore 114. In general, uncore 114 may include any part of processing circuit 110 not included in processor cores 112a-n (for instance, all or substantially all components of processing circuit 110 except for the processor cores 112a-n themselves). Processing circuit 110 may include power management logic 120 within uncore 114. Power management logic 120 may be operative to manage power of processing circuit 110. For example, power management logic 120 may specify the P-state of processing circuit 110 via P-state logic 122. For example, power management logic 120 may provide instructions, messages, commands, or other signals directing P-state logic 122 to change the P-state of processing circuit 110.

In some embodiments, power management of processing circuit 110 may be implemented by memory mapped IO (MMIO) or with specific physical registers such as model specific registers 124 (MSRs). In some embodiments, MSRs 124 may exist in hardware, such as a processor register, with one or more instructions to read/write to MSRs 124. In various embodiments, MSRs 124 may include or have an MSR/PECI interface for controlling processor performance and/or power consumption. For example, power management logic 120 and/or P-state logic 122 may read/write to MSRs to change the P-state of processing circuit 110. Non-limiting examples of MSR registers may include IA32_HWP_REQUEST.Activity_Window, IA32_HWP_REQUEST.Minimum (minimum performance), IA32_HWP_REQUEST.Maximum (maximum performance), IA32_HWP_REQUEST.Desired_Performance, and/or IA32_HWP_REQUEST.EPP (energy performance preference) registers.

Figure 4:
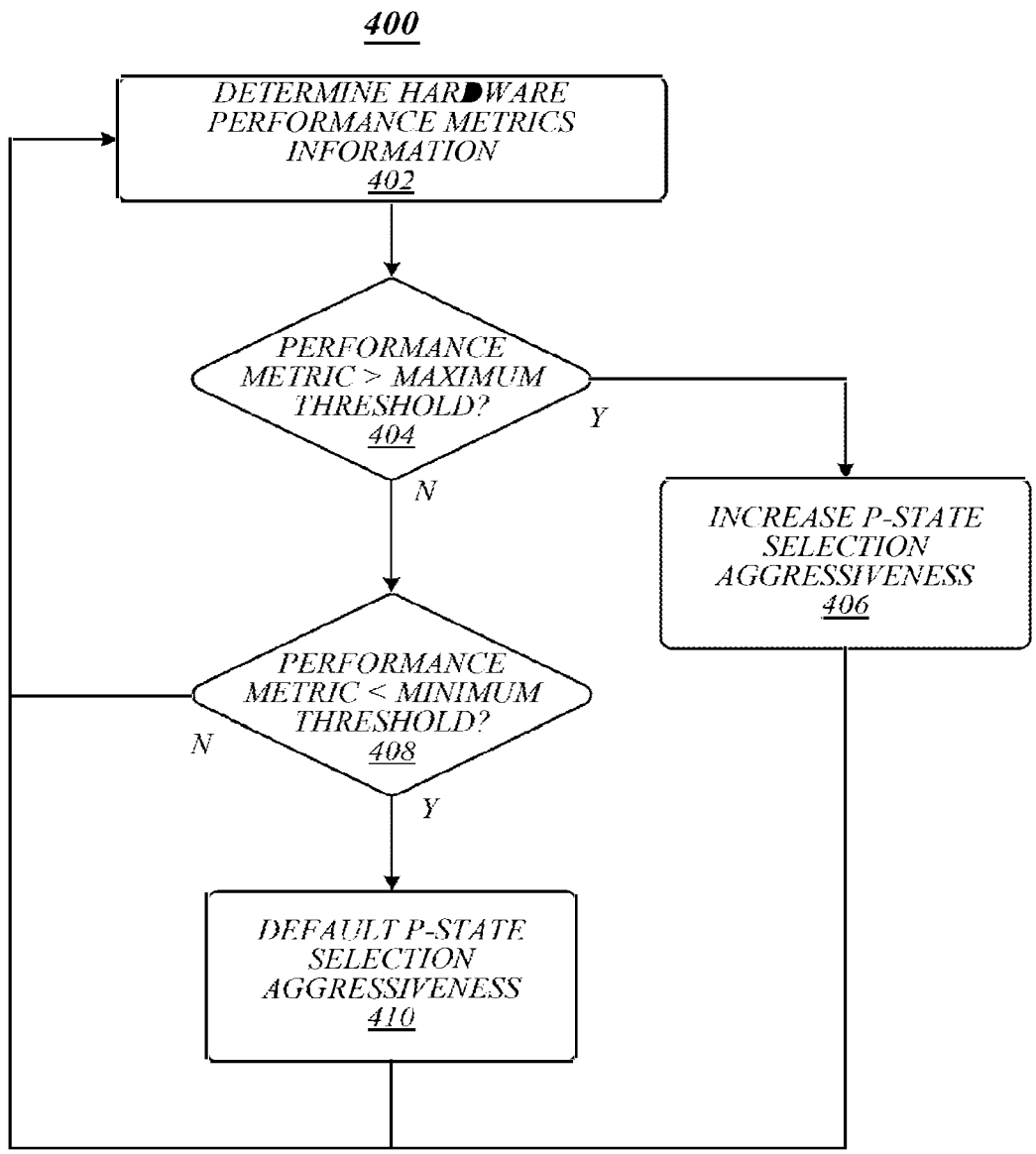
FIG. 4 illustrates an embodiment of a second logic flow.

OS performance state logic 130 may be operative to perform an OS (or software) performance state management process according to some embodiments (see, for example, FIG. 4). In some embodiments, references to software or OS may include virtual machine instances, software, hypervisors, managers (for instance, a VMM), and/or the like. In exemplary embodiments, OS performance state logic 130 may monitor performance metrics such as metrics relating to I/O conditions, memory condition, user interaction conditions, and consumer-producer conditions. Non-limiting examples of metrics monitored by OS performance state logic 130 may include interrupt requests, DPCs, softIRQs, tasklets, memory operations, soft page faults, user interaction events, and/or producer-consumer dependencies (thread dependencies). OS performance state logic 130 may generate performance metrics information 150 resulting from monitoring performance metrics. At least a portion of performance metrics information 150 may be stored in memory unit.

In some embodiments, OS performance state logic 130 may determine or access policy information 154 configured to indicate how aggressive to adjust the P-state of processing circuitry 110. For example, policy information 154 may include thresholds for performance metrics, minimum values, maximum values, and/or the like. In some embodiments, the thresholds may include minimum thresholds and/or maximum thresholds for one or more of the performance metrics. For example, policy information 154 may include a maximum threshold for soft page faults and a minimum threshold for soft page faults. Policy information 154 may also be used by and/or configured for hardware performance state logic 132 and/or hybrid performance state logic 134.

In various embodiments, based on policies configured in policy information 154, OS performance state logic 130 may adjust the P-state of processing circuitry. For example, in some embodiments, OS performance state logic 130 may adjust OS performance values (or hint values), such as specified in certain MRS registers. Non-limiting examples of MRS registers used by OS performance state logic 130 for OS performance values may include IA32_HWP_REQUEST.Minimum and/or IA32_HWP_REQUEST.EPP registers, for example, to provide a hint to HWP hardware. In this manner, OS performance state logic 130 may trigger a P-state selection based on performance metrics information 150 and/or utilization information 152.

Hardware performance state logic 132 may be operative to perform a hardware performance state management process according to some embodiments (see, for example, FIG. 4). In various embodiments, hardware performance state logic 132 may be, may include, and/or may access an HWP. In exemplary embodiments, hardware performance state logic 132 may include an interface that facilitates communication between and OS and processing circuitry 110 to enable the OS to oversee processor power management. In some embodiments, hardware performance state logic 132 may provide hardware-based processor performance management. In various embodiments, HWP may be an interface implemented via MSRs 124 as an interface (for example, via performance interface elements, such as an IA32_HWP_CAPABILITIES MSR) including highest, lowest and guaranteed performance values. In HWP, control may be provided via a request MSR (e.g., IA32_HWP_REQUEST MSR) that enables the range of operation (maximum and minimum performance), power performance hints and OS desired level. In some embodiments, HWP may include a thread-level MSR interface (hybrid performance interface element) (see, for example, FIG. 2) that the OS may set to indicate to hardware a P-state selection responsiveness (or aggressiveness) level.

In various embodiments, hardware performance state logic 132 may monitor the utilization of processing circuitry 110. Hardware performance state logic 132 may generate utilization information 152 that includes metrics of utilization of processing circuitry 110. In some embodiments, at least a portion of utilization information 152 may be stored in memory unit 115 for use by other logic structures, such as hybrid performance state logic 134 and/or operating system performance state logic 132. In exemplary embodiments, in addition to or in place of monitoring the utilization of processing circuitry, hardware performance state logic 132 may monitor performance metrics such as metrics relating to I/O conditions, memory condition, user interaction conditions, and consumer-producer conditions. Non-limiting examples of metrics monitored by hardware performance state logic 132 may include interrupt requests, DPCs, softIRQs, tasklets, memory operations, soft page faults, user interaction events, and/or producer-consumer dependencies (thread dependencies). Hardware performance state logic 132 may trigger a P-state selection based on performance metrics information 150 and/or utilization information 152 (see, for example, FIG. 3).

OS performance state logic 130 and hardware performance state logic 132 may provide improved performance state monitoring and adjustment compared to conventional systems, particularly in view of the use of performance metric information 150 according to some embodiments. Nonetheless, the round-trip time (for instance, from OS request to HW responding) may result in a slightly delayed P-state response in view of the time frames experienced through OS-only monitoring. In addition, hardware may provide a faster response time, but may not be able to monitor performance metrics information 150 such as I/O conditions, memory operation conditions, user interactions, and producer-consumer conditions, which are only visible to the OS. Accordingly, hybrid performance state logic 134 may operate using a cooperative performance state selection between OS and the hardware to provide the technological advantages of, at least, improved responsiveness, performance, and energy efficiency where the OS just provides hints through an interface (for instance, an MSR interface) configured according to some embodiments, and hardware computes and provides the needed responsive P-state based on the OS input.

Figure 2:
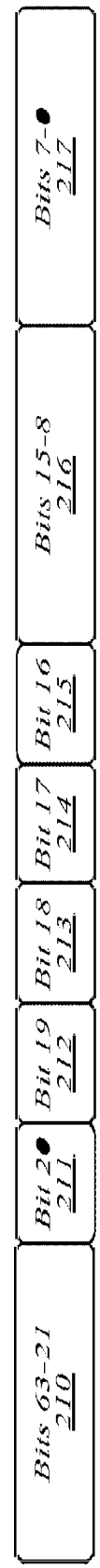
FIG. 2 illustrates an embodiment of a hybrid performance interface element.
Figure 5:
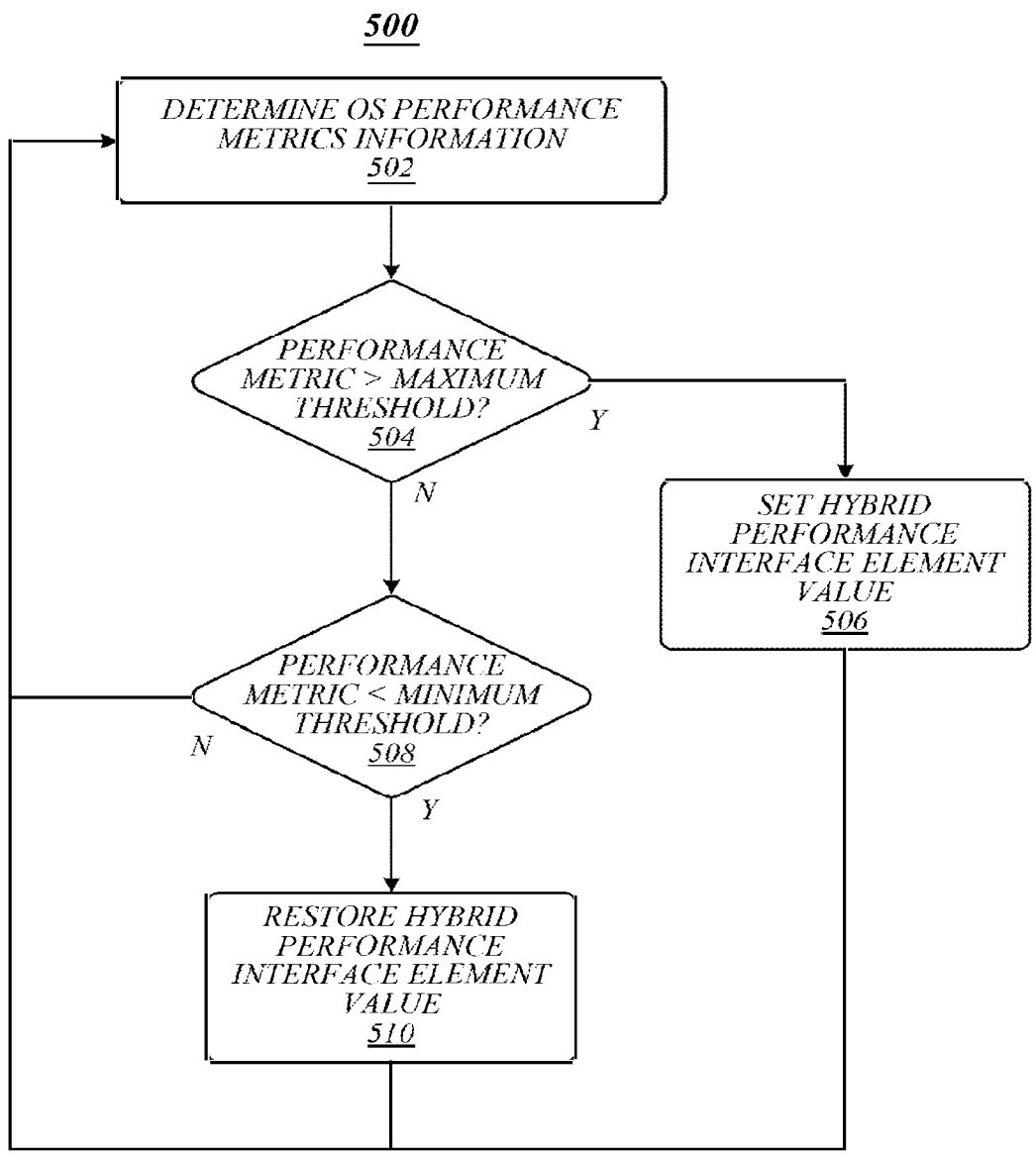
FIG. 5 illustrates an embodiment of a third logic flow.

Hybrid performance state logic 134 may be operative to perform a hybrid performance state management process according to some embodiments (see, for example, FIGS. 4 and 5). In various embodiments, hybrid performance state management process may use a performance interface element to communicate OS hints to hardware for hardware to make a P-state selection, for example, via P-state logic. FIG. 2 illustrates an embodiment of a hybrid performance interface element. As shown in FIG. 2, performance interface element 205 may include a plurality of bits or bit segments 210-217 representing performance metric values or hints. In various embodiments, performance interface element 205 may be configured to operate as an MSR element addressed as, for example, IA32_HWP_PROC_PERF_MSR.

In various embodiments, bits 63-21 210 may be reserved bits, bit 20 211 may indicate a producer-consumer dependency, bit 19 212 may indicate a user interaction event, bit 18 213 may indicate an OS quality of service (QoS) hint—high, bit 17 214 may indicate an OS quality of service (QoS) hint—medium, bit 16 215 may indicate an OS quality of service (QoS) hint—low, bits 15-18 216 may indicate a soft page fault delta count, and bits 7-0 may indicate an interrupt request (DPC, softIRQ, and/or the like) delta count. In some embodiments, OS performance state logic 130 may be operative to provide hints via performance interface element based on monitored metrics. Based on the hints indicated by bits 211-217, which are more indicative of exact system behavior than provided in conventional systems (for instance, EPP may only provide P-state selection preferences), hardware may more effectively and efficiently make P-state selections.

Referring to FIG. 1, Memory unit 115 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 115 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like. In various embodiments, memory unit 115 may store performance metrics information 150, utilization information, and/or policy information. In some embodiments, memory unit 115 may store a plurality of applications 160a-n for execution via processing circuitry 110. Applications 160a-n may include various types of software components, programs, applications, firmware, software modules, computer code, code fragments, instructions, processor instructions, asynchronous instructions, assembly code, machine code, binary code, compiled code, combinations of any of the foregoing, and/or the like.

I/O subsystem 140 may be embodied as circuitry and/or other components operative to facilitate I/O operations with processing circuitry 110, memory 115, and/or other components of apparatus. For example, I/O subsystem 140 may be embodied as, or otherwise include, memory controller hubs, I/O control hubs, firmware devices, communication links (for instance, point-to-point links, bus links, wires, cables, light guides, printed circuit board traces, and/or the like), and/or other components and subsystems to facilitate input/output operations. In some embodiments, I/O subsystem 140 may form a portion of a SoC and may be incorporated, along with processing circuitry 110, memory 115, and other components of apparatus, on a single integrated circuit chip User interface 180 may provide an interface for user interaction with apparatus 105. For example, user interface 180 may include various input devices, such as a mouse, keyboard, touchscreen, and/or the like.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 3:
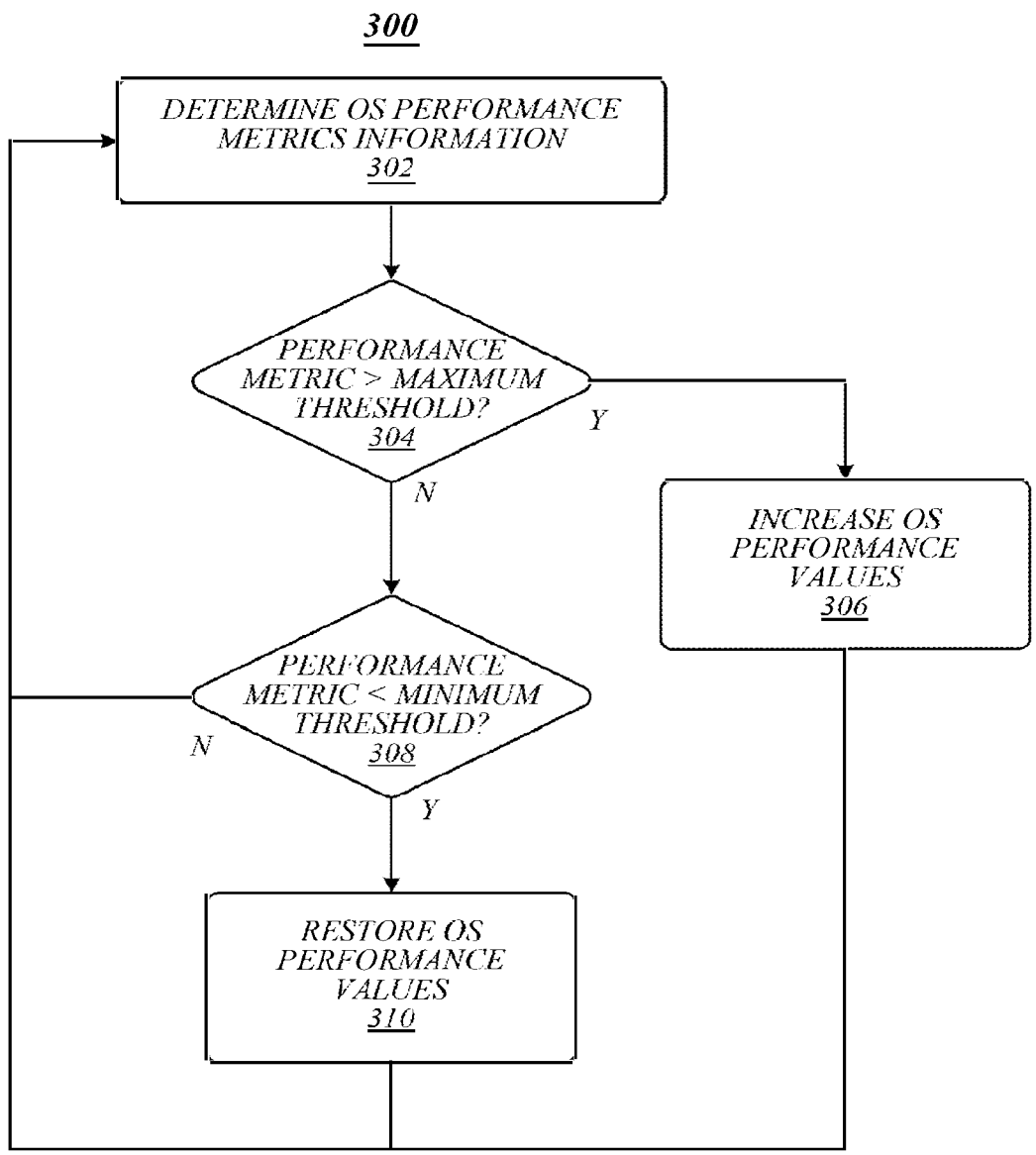
FIG. 3 illustrates an embodiment of a first logic flow.

FIG. 3 illustrates an embodiment of a logic flow 300. Logic flow 300 may be representative of some or all of the operations executed by one or more embodiments described herein, such as apparatus 105. In some embodiments, logic flow 300 may be representative of some or all of the operations of an OS performance state management process.

Logic flow 300 may determine OS performance metrics information at block 302. For example, in some embodiments, OS of apparatus 105 may keep track of OS performance metrics via OS performance state logic 130. In some embodiments, OS performance metrics may include performance metrics information 150 associated with one or more of system utilization, I/O conditions, memory condition, user interaction conditions, and consumer-producer conditions. Non-limiting examples of OS performance metrics monitored by OS performance state logic 130 may include system utilization, interrupt requests, DPCs, softIRQs, tasklets, soft page faults, user interaction events, and/or producer-consumer dependencies.

At block 304, logic flow 300 may determine whether the performance metrics have increased over a maximum threshold. For example, OS performance state logic 130 may compare the performance metrics to a maximum threshold specified in policy information 154. If the performance metrics have increased over the maximum threshold, logic flow 300 may increase the OS performance values at block 306. For example, if the performance metric of DPC (or interrupt rate) increases over a DPC maximum threshold, OS performance state logic 130 may increase EPP and/or minimum values to engage higher P-states. In some embodiments, OS performance state logic 130 may increase the OS performance values via MRSs, such as IA32_HWP_REQUEST.Minimum and/or IA32_HWP_REQUEST.EPP.

Logic flow 300 may determine whether the performance metrics have decreased below a minimum threshold at block 308. For example, OS performance state logic 130 may compare the performance metrics to a minimum threshold specified in policy information 154. If the performance metrics have decreased below the threshold, logic flow 300 may restore the OS performance values to default values (for instance, from a maximum value set at block 306) at block 310. Hardware performance state logic 132 may receive the request hints from OS performance state logic 130 implemented by logic flow 300 at block 306 and/or block 308 and adjust the P-state accordingly.

FIG. 4 illustrates an embodiment of a logic flow 400. Logic flow 400 may be representative of some or all of the operations executed by one or more embodiments described herein, such as apparatus 105. In some embodiments, logic flow 400 may be representative of some or all of the operations of a hardware performance state management process.

Logic flow 400 may determine hardware performance metrics information at block 402. For example, in some embodiments, hardware performance state logic 132, operating as a HWP-based hardware monitor, may keep track of hardware performance metric information. In some embodiments, hardware performance metrics may include performance metrics information 150 associated with one or more of system utilization, I/O conditions, memory condition, user interaction conditions, and consumer-producer conditions. Non-limiting examples of OS performance metrics monitored by hardware performance state logic 132 may include system utilization, interrupt requests or interrupt rates, DPCs, softIRQs, tasklets, soft page faults, user interaction events, and/or producer-consumer dependencies. In some embodiments, hardware performance state logic 132 may monitor hardware performance metrics on a per-processor basis in a multi-processor apparatus 105.

At block 404, logic flow 400 may determine whether the performance metrics have increased over a maximum threshold. For example, hardware performance state logic 132 may compare the performance metrics to a maximum threshold specified in policy information 154.

If the performance metrics have increased over the maximum threshold, logic flow 400 may increase the aggressiveness of P-state selection at block 406. For example, hardware performance state logic 132 may request HWP UBPS to be more aggressive in P-state selection. In one embodiment, aggressiveness may include having smaller changes in metrics lead to P-state changes and/or use of smaller coefficient values to determine P-state changes. Embodiments are not limited in this context.

Logic flow 400 may determine whether the performance metrics have decreased below a minimum threshold at block 408. For example, hardware performance state logic 132 may compare the performance metrics to a minimum threshold specified in policy information 154. If the performance metrics have decreased below the threshold, logic flow 400 may restore the P-state selection aggressivness to default values (for instance, from a higher selection aggressiveness set at block 406) at block 410.

FIG. 5 illustrates an embodiment of a logic flow 500. Logic flow 500 may be representative of some or all of the operations executed by one or more embodiments described herein, such as apparatus 105. In some embodiments, logic flow 500 may be representative of some or all of the operations of an OS hint generation process.

Logic flow 500 may determine OS performance metrics information at block 502. For example, in some embodiments, OS of apparatus 105 may keep track of OS performance metrics via OS performance state logic 130. At block 504, logic flow 500 may determine whether the performance metrics have increased over a maximum threshold. If one of the performance metrics have increased over the maximum threshold, logic flow 500 may set a value of hybrid performance interface element. For example, OS performance state logic 130 may set a value of hybrid performance interface element 205 corresponding to the performance metric above the maximum threshold. For instance, if the soft page fault delta count is over a corresponding maximum threshold specified in policy information 154, OS performance state logic 130 may set a corresponding value (or bit) in bits 15-18 of hybrid performance interface element 205. Hardware performance state logic 132 may receive or otherwise access the hybrid performance interface element 205 and cause the adjustment of the P-state accordingly.

At block 508, logic flow 500 may determine whether the performance metrics have decreased below a minimum threshold. If one of the performance metrics have decreased below the maximum threshold, logic flow 500 may set a value of hybrid performance interface element at block 510 to a default value, resetting a bit, decrementing a current value by a specified amount, and/or the like.

Figure 6:
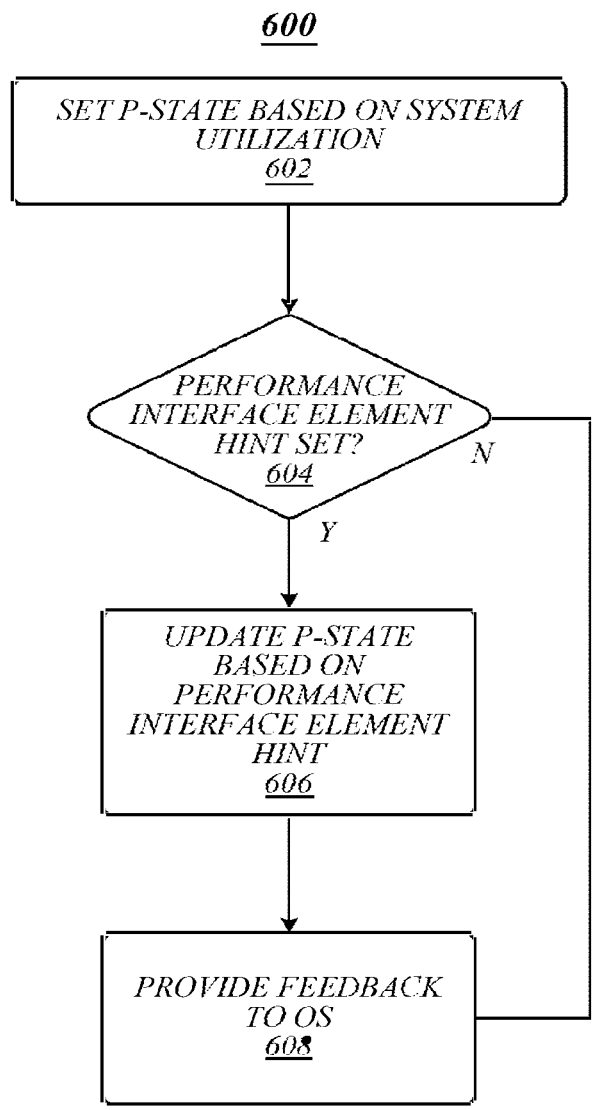
FIG. 6. illustrates an embodiment of a fourth logic flow.

FIG. 6 illustrates an embodiment of a logic flow 600. Logic flow 600 may be representative of some or all of the operations executed by one or more embodiments described herein, such as apparatus 105. In some embodiments, logic flow 600 may be representative of some or all of the operations of a hybrid performance state management process.

At block 602, logic flow 600 may determine a hardware-based P-state determined, for example, using system utilization. For example, hardware performance state logic 130 may determine system utilization (for instance, processor utilization) and set a P-state via P-state logic 122. In some embodiments, P-state selection by hardware performance state logic 130 based on system utilization may use a UBPS or UBPS-based process. Logic flow 600 may determine whether performance interface element values or hints have been set at block 604. For example, hardware performance state logic 130 may receive or otherwise access hybrid performance interface element 205 to determine whether any of bits 211-217 have been set (or have modified values since previous check) by OS performance state logic 130. If logic flow 600 determines that the performance interface element hints have not been set, logic flow 600 may provide feedback to the OS at block 608. For example, hardware performance state logic 132 may provide feedback that the performance interface element 205 values were not set and/or that the P-state is set based on system utilization, for instance, via UBPS.

If logic flow 600 determines that the performance interface element hints have been set, logic flow 600 may update P-state based on performance interface element values at block 606. For example, hardware performance state logic 132 may increase the P-state set by logic flow 600 at block 602 by step value (for instance, X bins or levels). In some embodiments, the value or aggressiveness of X may be varied for certain bits of hybrid performance interface element 205 (for instance, IAS_HWP_PROC_PERF_MSR). For instance, if user interaction event bit 19 212 is set, more aggressive P-state selection may be implemented versus OS quality of service (QoS) hint—low. Logic flow 600 may provide feedback to the OS at block 608. For example, hardware performance state logic 132 may provide feedback that the performance interface element 205 values were set, which values were set, and the P-state (or X) selected at block 606.

Figure 7A:
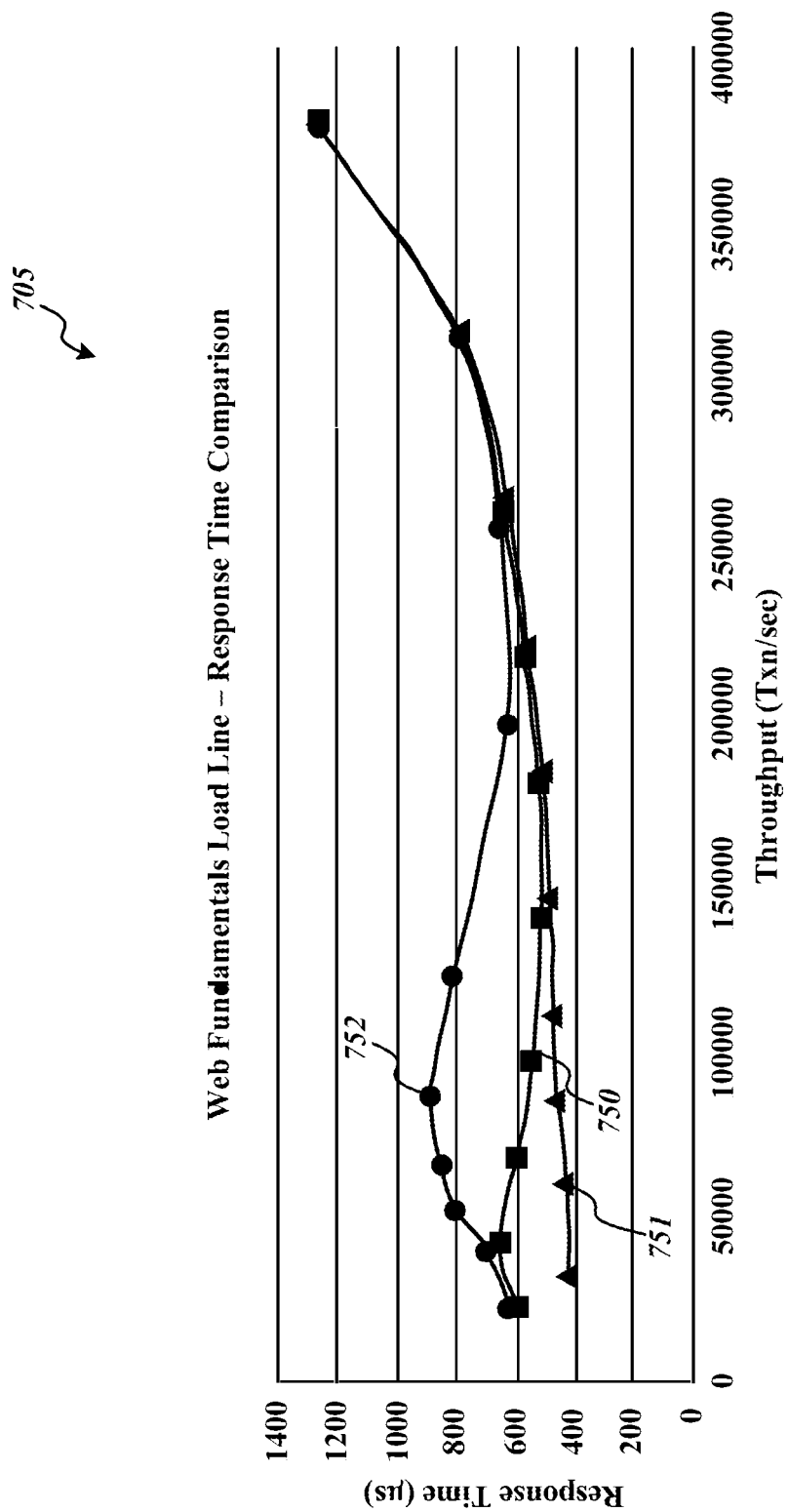
Figure 7B:
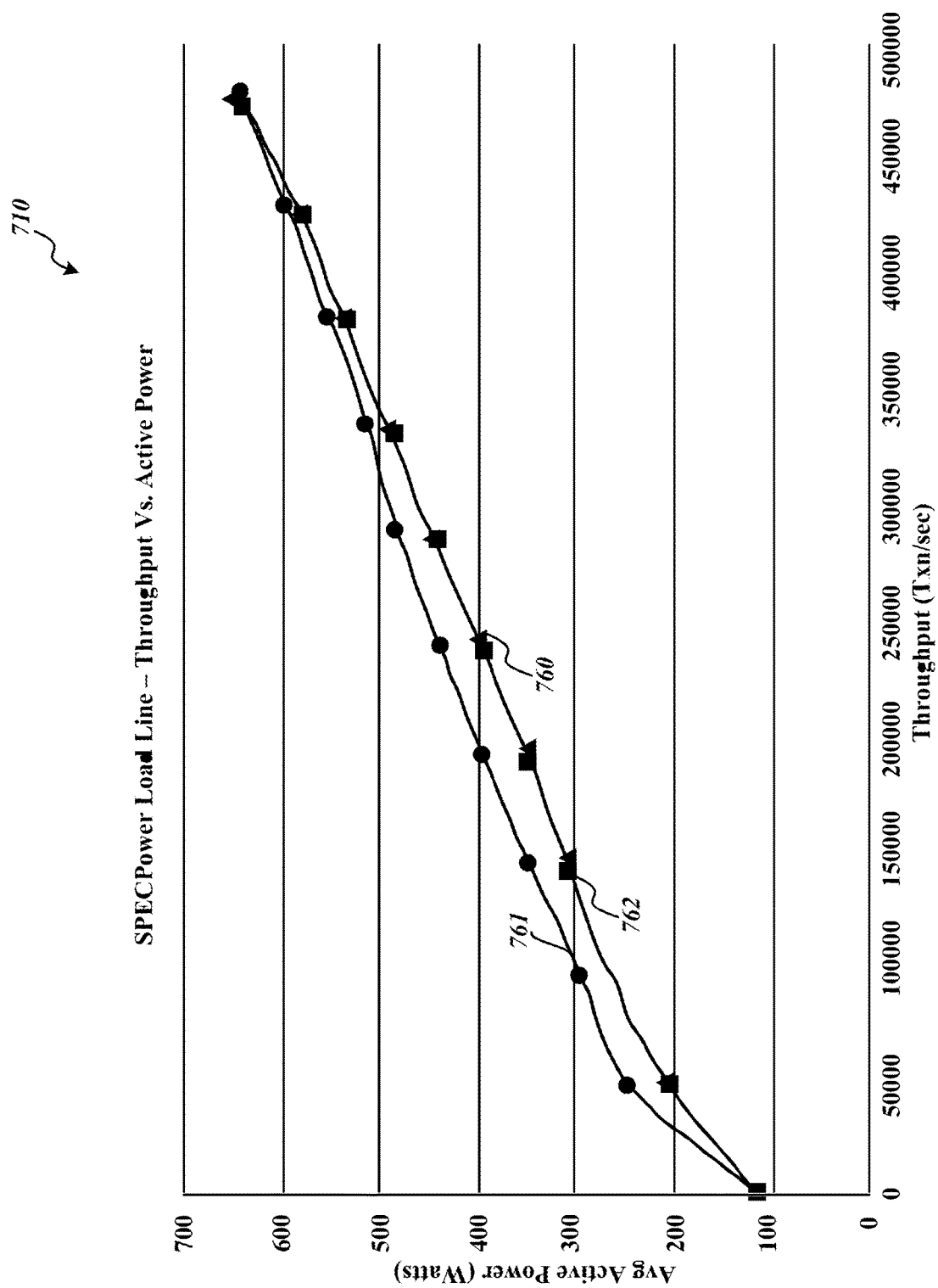

FIGS. 7A-7C depict experimental results of a processes configured according to some embodiments. FIG. 7A depicts a graph 705 of a web fundamentals load line—response time comparison depicting results for a conventional HWP process 750, a HWP process according to some embodiments 751, and a legacy balanced (single stepping) process 752. The experimental results depicted in FIG. 7A were performed on an Intel® Xeon® platform (SKX). As shown in FIG. 7A, P-state selection processes according to some embodiments may demonstrate at least a 30% improvement over conventional processes, for example, for I/O intensive but low-utilization conditions.

FIG. 7B depicts a graph 710 of experimental results for a SPECPower benchmark analysis for a conventional HWP process 760, a conventional HWP high-performance process 761, and an HWP process according to some embodiments 762. As shown in graph 710, an HWP process according to some embodiments does not cause an increase of power for the entire load line, indicating the energy efficiency of an HWP process according to some embodiments.

FIG. 7C depicts a table 715 of client workloads (hours of batter life (HoBL) for a conventional HWP process 770, a hybrid performance state management process according to some embodiments 771, and a conventional HWP high-performance process 772. As shown in FIG. 7C, a hybrid performance state management process according to some embodiments, for instance, using a race-to-halt approach, provides improved power savings (for instance, 4-8% HoBL improvement) compared with conventional processes.

Figure 8:
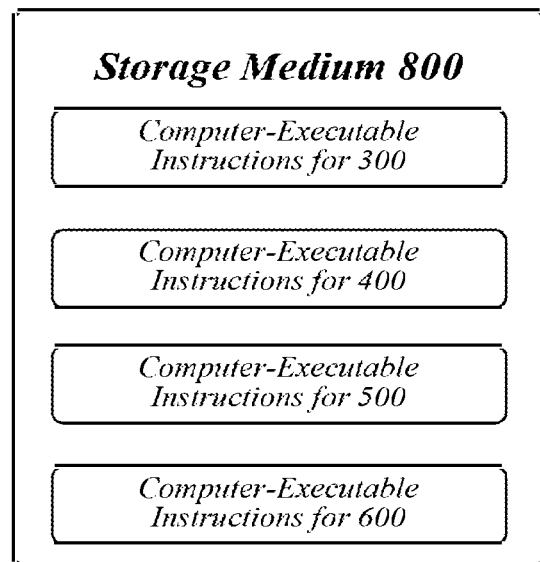
FIG. 8 illustrates an example of a storage medium.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flows 300, 400, 500, and/or 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
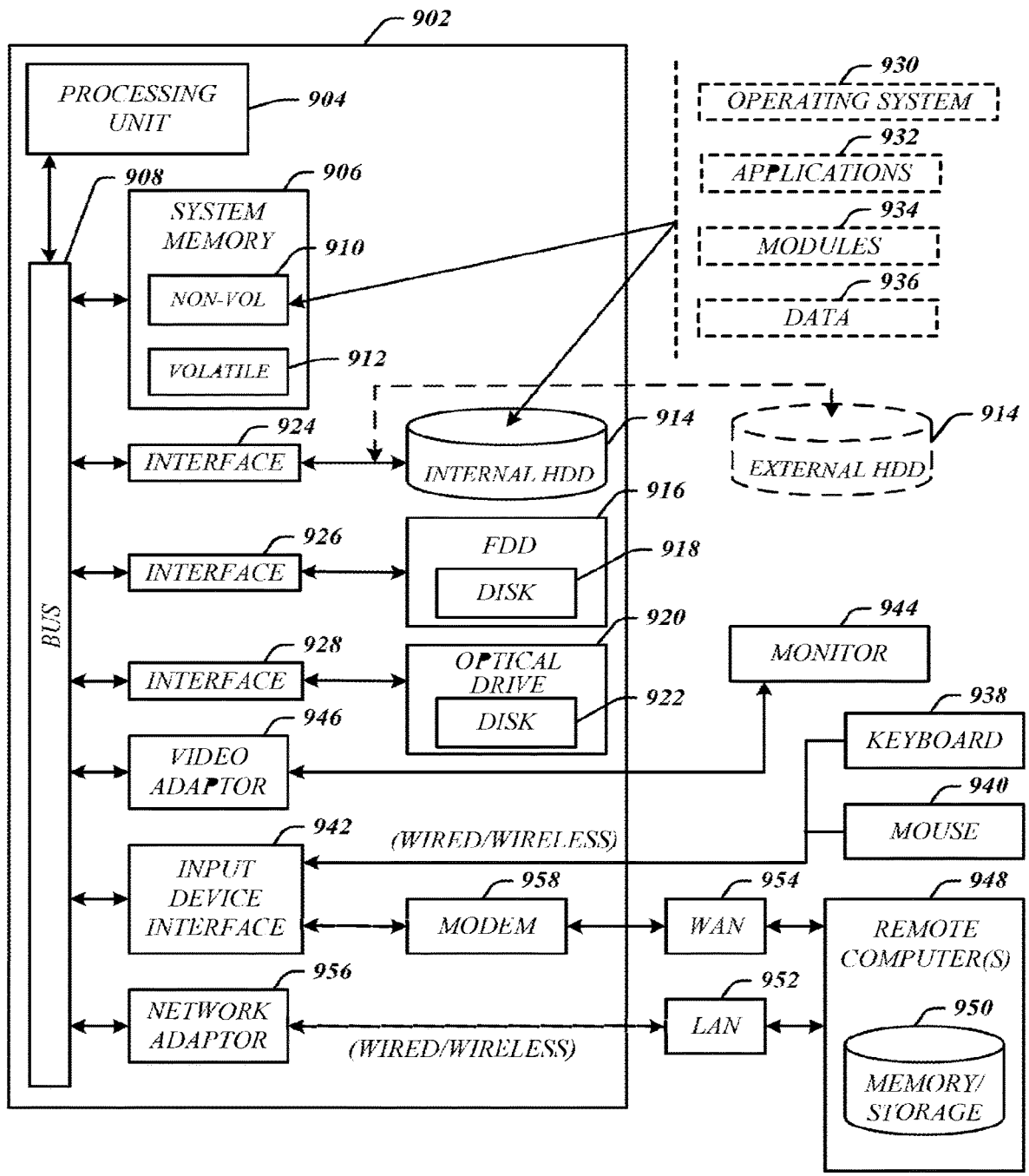
FIG. 9 illustrates an embodiment of a computing architecture.

FIG. 9 illustrates an embodiment of an exemplary computing architecture 900 suitable for implementing various embodiments as previously described. In various embodiments, the computing architecture 900 may comprise or be implemented as part of an electronic device. In some embodiments, the computing architecture 900 may be representative, for example, of apparatus 105 or 205. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 909. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 909 provides an interface for system components including, but not limited to, the system memory 906 to the processing unit 904. The system bus 909 can be any of several types of bus structure that may further interconnect to a memory bus (with or without a memory controller), a peripheral bus, and a local bus using any of a variety of commercially available bus architectures. Interface adapters may connect to the system bus 909 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 919, and an optical disk drive 920 to read from or write to a removable optical disk 922 (e.g., a CD-ROM or DVD). The HDD 914, FDD 916 and optical disk drive 920 can be connected to the system bus 909 by a HDD interface 924, an FDD interface 926 and an optical drive interface 929, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of apparatus 105, 205, 305, and/or 405.

A user can enter commands and information into the computer 902 through one or more wire/wireless input devices, for example, a keyboard 939 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 909, but can be connected by other interfaces such as a parallel port, IEEE 1394 serial port, a game port, a USB port, an IR interface, and so forth.

A monitor 944 or other type of display device is also connected to the system bus 909 via an interface, such as a video adaptor 946. The monitor 944 may be internal or external to the computer 802. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 949. The remote computer 949 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 959, or is connected to a communications server on the WAN 954, or has other means for establishing communications over the WAN 954, such as by way of the Internet. The modem 959, which can be internal or external and a wire and/or wireless device, connects to the system bus 909 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following are non-limiting example embodiments:

Example 1 is an apparatus, comprising at least one memory, at least one processing circuitry, and logic, at least a portion of the logic comprising hardware logic coupled to the at least one processing circuitry, to set a first P-state of the at least one processing circuitry based on system utilization information, access a performance interface element comprising a plurality of performance metric hints, update the first P-state to a second P-state responsive to one of the plurality of performance metric hints being set by an operating system (OS) of the apparatus, and maintain the first P-state responsive to none of the plurality of performance metric hints being set by the operating system (OS).

Example 2 is the apparatus of Example 1, the logic comprising a hardware performance state logic implementing hardware P-states (HWP).

Example 3 is the apparatus of Example 1, the logic comprising a hardware performance state logic implementing utilization-based P-state selection (UBPS).

Example 4 is the apparatus of Example 1, the logic comprising a hybrid performance state logic.

Example 5 is the apparatus of Example 1, the plurality of performance metric hints updated via an operating system (OS) performance state interface logic.

Example 6 is the apparatus of Example 1, the performance interface element comprising a hybrid performance interface element.

Example 7 is the apparatus of Example 1, the performance interface element comprising a model specific register (MSR).

Example 8 is the apparatus of Example 1, the performance interface element comprising a model specific register (MSR) comprising a plurality of bits representing the plurality of performance metric hints.

Example 9 is the apparatus of Example 1, the plurality of performance metric hints comprising at least one of I/O hints, memory hints, user interaction hints, quality of service (QoS) hints, or consumer-producer hints.

Example 10 is the apparatus of Example 1, the plurality of performance metric hints comprising at least one of an interrupt rate, a soft page fault rate, a user interaction event, or a producer-consumer dependency.

Example 11 is the apparatus of Example 1, the logic to update the first P-state to the second P-state by increasing the first P-state by a step value determined based on the one of the plurality of performance metric hints set by the OS.

Example 12 is the apparatus of Example 1, the logic to determine the first P-state using utilization-based P-state selection (UBPS).

Example 13 is a system, comprising the apparatus according to any of claims 1-12, and at least one network interface.

Example 14 is a method, comprising setting a first P-state of at least one processing circuitry of a computing device based on system utilization information, accessing a performance interface element comprising a plurality of performance metric hints, updating the first P-state to a second P-state responsive to one of the plurality of performance metric hints being set by an operating system (OS) of the computing device, maintaining the first P-state responsive to none of the plurality of performance metric hints being set by the operating system (OS).

Example 15 is the method of Example 14, comprising setting and updating the first P-state using a hardware performance state logic implementing hardware P-states (HWP).

Example 16 is the method of Example 14, comprising setting and updating the first P-state using a hardware performance state logic implementing utilization-based P-state selection (UBPS).

Example 17 is the method of Example 14, comprising setting and updating the first P-state and the second P-state using a hybrid performance state logic.

Example 18 is the method of Example 14, the plurality of performance metric hints updated via an operating system (OS) performance state interface logic.

Example 19 is the method of Example 14, the performance interface element comprising a hybrid performance interface element.

Example 20 is the method of Example 14, the performance interface element comprising a model specific register (MSR).

Example 21 is the method of Example 14, the performance interface element comprising a model specific register (MSR) comprising a plurality of bits representing the plurality of performance metric hints.

Example 22 is the method of Example 14, the plurality of performance metric hints comprising at least one of I/O hints, memory hints, user interaction hints, quality of service (QoS) hints, or consumer-producer hints.

Example 52 is the apparatus of Example 41, the at least one producer instruction comprising a plurality of producer instructions, the consumer instruction comprising a consumer of one of the plurality of producer instructions, the program analysis means to generate at least one dynamic control-flow trace to identify one of the plurality of producer instructions operating as a producer for the consumer instruction.

Example 23 is the method of Example 14, the plurality of performance metric hints comprising at least one of an interrupt rate, a soft page fault rate, a user interaction event, or a producer-consumer dependency.

Example 24 is the method of Example 14, comprising updating the first P-state to the second P-state by increasing the first P-state by a step value determined based on the one of the plurality of performance metric hints set by the OS.

Example 25 is the method of Example 14, comprising determining the first P-state using utilization-based P-state selection (UBPS).

Example 26 is a non-transitory computer-readable storage medium that stores computer-executable instructions for execution by processing circuitry of a computing device, the computer-executable instructions, when executed, to cause the computing device to set a first P-state of at least one processing circuitry of a computing device based on system utilization information, access a performance interface element comprising a plurality of performance metric hints, update the first P-state to a second P-state responsive to one of the plurality of performance metric hints being set by an operating system (OS) of the computing device, maintain the first P-state responsive to none of the plurality of performance metric hints being set by the operating system (OS).

Example 27 is the non-transitory computer-readable storage medium of Example 26, the computer-executable instructions, when executed, to cause the computing device to set and update the first P-state using a hardware performance state logic implementing hardware P-states (HWP).

Example 28 is the non-transitory computer-readable storage medium of Example 26, the computer-executable instructions, when executed, to cause the computing device to set and update the first P-state using a hardware performance state logic implementing utilization-based P-state selection (UBPS).

Example 29 is the non-transitory computer-readable storage medium of Example 26, the computer-executable instructions, when executed, to cause the computing device to set and update the first P-state and the second P-state using a hybrid performance state logic.

Example 30 is the non-transitory computer-readable storage medium of Example 26, the plurality of performance metric hints updated via an operating system (OS) performance state interface logic.

Example 31 is the non-transitory computer-readable storage medium of Example 26, the performance interface element comprising a hybrid performance interface element.

Example 32 is the non-transitory computer-readable storage medium of Example 26, the performance interface element comprising a model specific register (MSR).

Example 33 is the non-transitory computer-readable storage medium of Example 26, the performance interface element comprising a model specific register (MSR) comprising a plurality of bits representing the plurality of performance metric hints.

Example 34 is the non-transitory computer-readable storage medium of Example 26, the plurality of performance metric hints comprising at least one of I/O hints, memory hints, user interaction hints, quality of service (QoS) hints, or consumer-producer hints.

Example 35 is the non-transitory computer-readable storage medium of Example 26, the plurality of performance metric hints comprising at least one of an interrupt rate, a soft page fault rate, a user interaction event, or a producer-consumer dependency.

Example 36 is the non-transitory computer-readable storage medium of Example 26, the computer-executable instructions, when executed, to cause the computing device to update the first P-state to the second P-state by increasing the first P-state by a step value determined based on the one of the plurality of performance metric hints set by the OS.

Example 37 is the non-transitory computer-readable storage medium of Example 26, the computer-executable instructions, when executed, to cause the computing device to determine the first P-state using utilization-based P-state selection (UBPS).

Example 38 is an apparatus, comprising a P-state determination means to set a first P-state of the at least one processing circuitry based on system utilization information, access a performance interface element comprising a plurality of performance metric hints, update the first P-state to a second P-state responsive to one of the plurality of performance metric hints being set by an operating system (OS) of the apparatus, and maintain the first P-state responsive to none of the plurality of performance metric hints being set by the operating system (OS).

Example 39 is the apparatus of Example 38, the P-state determination means comprising a hardware performance state logic implementing hardware P-states (HWP).

Example 40 is the apparatus of Example 38, the P-state determination means comprising a hardware performance state logic implementing utilization-based P-state selection (UBPS).

Example 41 is the apparatus of Example 38, the P-state determination means comprising a hybrid performance state logic.

Example 42 is the apparatus of Example 38, the plurality of performance metric hints updated via an operating system (OS) performance state interface logic.

Example 43 is the apparatus of Example 38, the performance interface element comprising a hybrid performance interface element.

Example 44 is the apparatus of Example 38, the performance interface element comprising a model specific register (MSR).

Example 45 is the apparatus of Example 38, the performance interface element comprising a model specific register (MSR) comprising a plurality of bits representing the plurality of performance metric hints.

Example 46 is the apparatus of Example 38, the plurality of performance metric hints comprising at least one of I/O hints, memory hints, user interaction hints, quality of service (QoS) hints, or consumer-producer hints.

Example 47 is the apparatus of Example 38, the plurality of performance metric hints comprising at least one of an interrupt rate, a soft page fault rate, a user interaction event, or a producer-consumer dependency.

Example 48 is the apparatus of Example 38, the P-state determination means to update the first P-state to the second P-state by increasing the first P-state by a step value determined based on the one of the plurality of performance metric hints set by the OS.

Example 49 is the apparatus of Example 38, the P-state determination means to determine the first P-state using utilization-based P-state selection (UBPS).

Example 50 is a system, comprising the apparatus according to any of claims 38-49, and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    at least one memory;
    at least one processing circuitry; and
    logic, at least a portion of the logic comprising hardware logic coupled to the at least one processing circuitry, to:
        set a first performance state (P-state) of the at least one processing circuitry based on system utilization information;
        access a performance interface element comprising a plurality of performance metric hints, the plurality of performance metric hints comprising at least a multi-thread dependency in a per-core P-state system (PCSP);
        update the first P-state to a second P-state responsive to one of the plurality of performance metric hints being set by an operating system (OS) of the apparatus; and
        maintain the first P-state responsive to none of the plurality of performance metric hints being set by the operating system (OS).

2. The apparatus of claim 1, the logic comprising a hardware performance state logic implementing hardware P-states (HWP).

3. The apparatus of claim 1, the logic comprising a hardware performance state logic implementing utilization-based P-state selection (UBPS).

4. The apparatus of claim 1, the logic comprising a hybrid performance state logic.

5. The apparatus of claim 1, the plurality of performance metric hints updated via an operating system (OS) performance state interface logic.

6. The apparatus of claim 1, the performance interface element comprising a hybrid performance interface element.

7. The apparatus of claim 1, the performance interface element comprising a model specific register (MSR).

8. The apparatus of claim 1, the performance interface element comprising a model specific register (MSR) comprising a plurality of bits representing the plurality of performance metric hints.

9. The apparatus of claim 1, the plurality of performance metric hints comprising at least one of I/O hints, memory hints, user interaction hints, quality of service (QoS) hints, or consumer-producer hints.

10. The apparatus of claim 1, the plurality of performance metric hints comprising at least one of an interrupt rate, a soft page fault rate, a user interaction event, or a producer-consumer dependency.

11. A method, comprising:
    setting a first performance state (P-state) of at least one processing circuitry of a computing device based on system utilization information;

accessing a performance interface element comprising a plurality of performance metric hints, the plurality of performance metric hints comprising at least a multi-thread dependency in a per-core P-state system (PCSP);

updating the first P-state to a second P-state responsive to one of the plurality of performance metric hints being set by an operating system (OS) of the computing device;

maintaining the first P-state responsive to none of the plurality of performance metric hints being set by the operating system (OS).

12. The method of claim 11, comprising setting and updating the first P-state using a hardware performance state logic implementing hardware P-states (HWP).

13. The method of claim 11, comprising setting and updating the first P-state using a hardware performance state logic implementing utilization-based P-state selection (UBPS).

14. The method of claim 11, comprising setting and updating the first P-state and the second P-state using a hybrid performance state logic.

15. The method of claim 11, the plurality of performance metric hints updated via an operating system (OS) performance state interface logic.

16. The method of claim 11, the performance interface element comprising a hybrid performance interface element.

17. The method of claim 11, the performance interface element comprising a model specific register (MSR).

18. The method of claim 11, the performance interface element comprising a model specific register (MSR) comprising a plurality of bits representing the plurality of performance metric hints.

19. The method of claim 11, the plurality of performance metric hints comprising at least one of I/O hints, memory hints, user interaction hints, quality of service (QoS) hints, or consumer-producer hints.

20. The method of claim 11, the plurality of performance metric hints comprising at least one of an interrupt rate, a soft page fault rate, a user interaction event, or a producer-consumer dependency.

21. A non-transitory computer-readable storage medium that stores computer-executable instructions for execution by processing circuitry of a computing device, the computer-executable instructions, when executed, to cause the computing device to:

set a first performance state (P-state) of at least one processing circuitry of a computing device based on system utilization information;

access a performance interface element comprising a plurality of performance metric hints, the plurality of performance metric hints comprising at least a multi-thread dependency in a per-core P-state system (PCSP);

update the first P-state to a second P-state responsive to one of the plurality of performance metric hints being set by an operating system (OS) of the computing device;

maintain the first P-state responsive to none of the plurality of performance metric hints being set by the operating system (OS).

22. The non-transitory computer-readable storage medium of claim 21, the computer-executable instructions, when executed, to cause the computing device to set and update the first P-state using a hardware performance state logic implementing hardware P-states (HWP).

23. The non-transitory computer-readable storage medium of claim 21, the computer-executable instructions, when executed, to cause the computing device to set and update the first P-state using a hardware performance state logic implementing utilization-based P-state selection (UBPS).

24. The non-transitory computer-readable storage medium of claim 21, the computer-executable instructions, when executed, to cause the computing device to set and update the first P-state and the second P-state using a hybrid performance state logic.

25. The non-transitory computer-readable storage medium of claim 21, the plurality of performance metric hints updated via an operating system (OS) performance state interface logic.

\* \* \* \* \*